Nov. 13, 1928.
M. WALTHER
1,691,505
ELECTRODE
Filed May 14, 1926
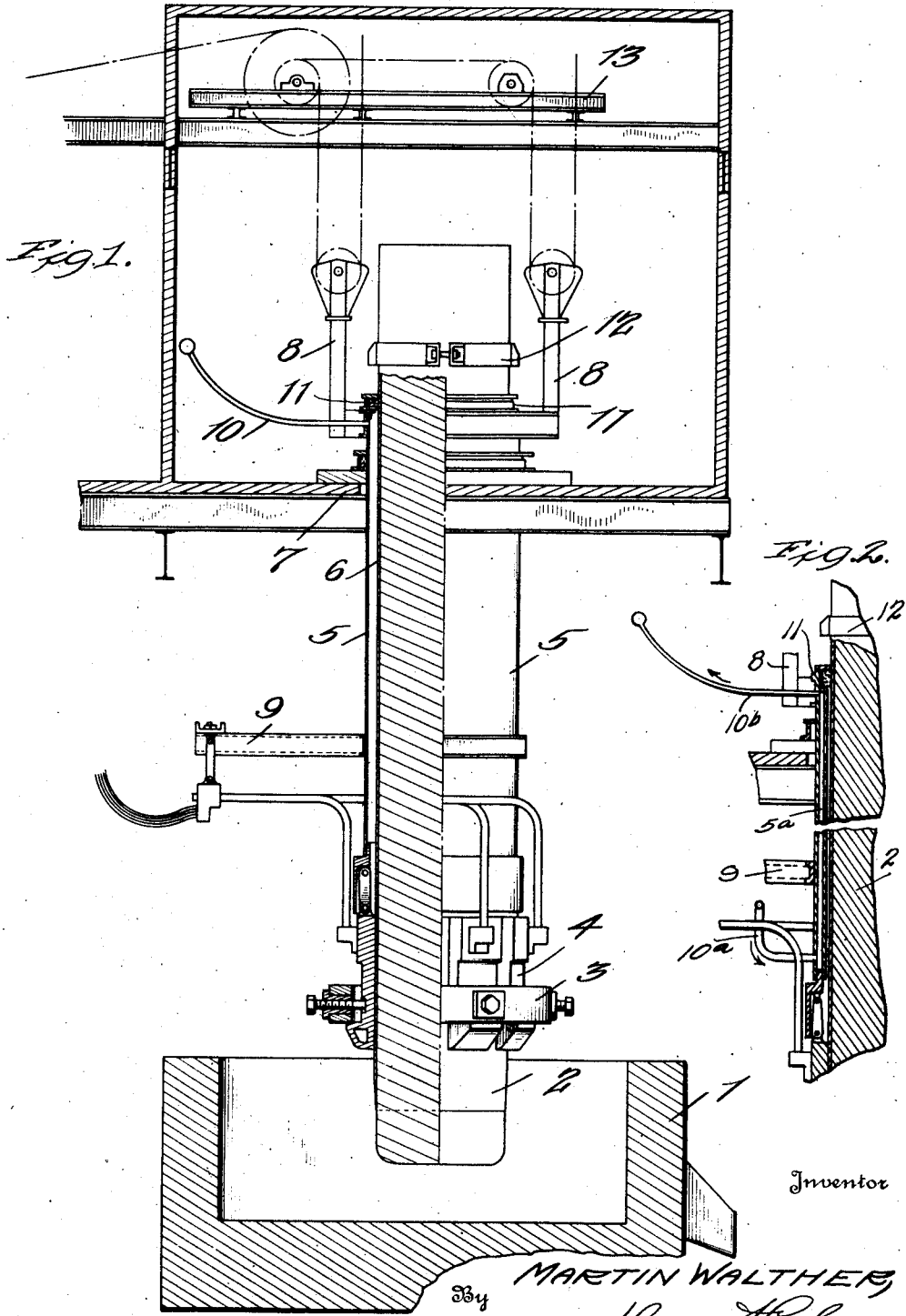
Inventor
MARTIN WALTHER,
Dorsey Cole
Attorney Patented Nov. 13, 1928.

1,691,505

UNITED STATES PATENT OFFICE.

MARTIN WALTHER, OF OSLO, NORWAY, ASSIGNOR TO DET NORSKE AKTIESELSKAB FOR ELEKTROKEMISK INDUSTRI, OF OSLO, NORWAY.

ELECTRODE.

Application filed May 14, 1926, Serial No. 109,190, and in Norway May 15, 1925.

The present invention relates to electrodes, which are baked in the furnace in which they are used and has for its object the arrangement of a casing around the electrode outside the mantle which is used as a mould for the electrode during the tamping. Thus the casing does not follow the electrode down into the furnace and the electrode must be able to slide down through the casing. It will often be advantageous to make the casing with double walls affording opportunity of artificial cooling either with a liquid or with cold air.

The arrangement of such a casing outside the electrode affords many important advantages. The electrode is protected against dust and the contact surfaces for introduction of current will always keep clean. On account of the cooling effect of the casing the electrode mass in the upper part of the electrode will remain raw and a homogeneous connection is thus obtained when new mass is tamped on the electrode. This is very important as it is impossible to obtain a good connection by tamping raw electrode mass on partly baked mass. By being able to keep the electrode mass above the holder entirely raw by means of such a casing it will be possible to employ the continuous electrode in open furnaces without building a tamping house around its upper end. The building up of the electrode may then take place outside the furnace and the electrodes installed as is done with ready baked electrodes. If desirable the casing may be made in the form of two or more telescopic tubes whereby the length of the casing may be varied as desired. Further the casing may be used for suspension of the electrode, by attaching the suspending device to the upper part of the casing which is generally supplied with a stuffing box. In the event the electrode is built up above or in connection with the furnace in which it is employed, the suspending means may be erected in the tamping house. By such arrangement pulleys for suspension, bearings and wires are protected from the heat of the furnace. The suspension-devices are mounted on a frame which may be displaced horizontally along or across the furnace. Thereby a very simple means of altering the position of the electrode within the furnace is obtained. It is of importance thus to be able to displace the electrode simply and quickly when electrical conditions of the furnace or the composition of the charge make it necessary. If the tamping house is present provision must be made for this lateral movement of the electrode by making the electrode hole in the tamping house floor sufficiently large.

Means may be provided for preventing the electrode from sliding too far and short-circuiting the furnace when the gripping members are loosened to displace the holder relatively to the electrode. For example a stopping ring may be fastened around the electrode at a distance above the uppermost edge of the casing corresponding to the maximum allowable "drop" of the electrode.

When the electrode holder is loosened to lower the electrode the stopping ring will move with the electrode and stop its movement by striking against the stuffing box of the casing. After the electrode is again gripped by the holder, the stopping-ring is loosened and placed higher up on the electrode ready for the next "drop."

Generally it will be advantageous to make the casing of iron plate.

The electrode holder may be made in known way and any type of electrode holder may be employed. It is, however, generally preferred to employ a holder which is so constructed that the electrode may be lowered during full operation without breaking the current. Such a holder is for instance described in U. S. Patent No. 1,498,582.

An example of the invention is illustrated in the drawing forming part of this application. In such drawing Fig. 1 represents an elevational view, partly in section, of a furnace installation incorporating one form of the invention.

Fig. 2 represents a view similar to Fig. 1, parts being broken away, illustrating another form of the invention.

Referring more particularly to the drawing, 1 is an electric furnace, 2 is a self-baking electrode, and 3 is a ring having means for tightening each single electrode gripping member 4. The gripping members are suspended in the lower end of the casing 5 which is placed outside the actual electrode mantle 6 and is led through the floor of the tamping house 7 and at its upper end is fastened to the suspension arrangement 8 which may be raised and lowered in known manner. 11 is the stuffing box at the upper end of the casing, against which the stopping ring 12 may engage when the electrode has moved through its maximum "drop." The displacable frame is indicated at 13. To the casing 5 is fastened a carrier arrangement 9 for the electric leads conducting current to the electrode. Air or other cooling gas for cooling the casing is admitted near the upper end thereof as indicated at 10. When the air is blown in it penetrates downwards between the electrode mantle 6 and the protecting casing 5 and passes out at the lower end of the casing. If it is desired to cool by means of a liquid the casing must of course be made with a double wall as illustrated at 5ª, Fig. 2, and special inlet and outlet for the cooling fluid provided, as illustrated at 10ª and 10ᵇ, respectively, Fig. 2.

The foregoing detailed description has been given for purposes of clearness of understanding only and no undue limitation should be deduced therefrom but the appended claims should be construed as broadly as permissible in view of the prior art.

What I claim as new and desire to secure by Letters Patent of the United States is:

1. The combination of an electrode baked while in use in the electric furnace, and having a mantle enveloping the electrode mass, an electrode holder, and a casing surrounding and spaced from the mantle, and arranged above the electrode holder, the mantle together with the electrode therein contained being movable longitudinally with respect to the casing.

2. The combination of an electrode baked while in use in the electric furnace and having a mantle enveloping the electrode mass, a room wherein the tamping of the electrode mass into the mantle is effected, and a casing surrounding the electrode in spaced relation thereto, the upper end of said casing being located in said room.

3. The combination of an electrode baked while in use in the electric furnace and having a mantle enveloping the electrode mass, a casing surrounding and spaced from the mantle, and means for introducing cooling media between the mantle and casing.

4. A selfbaking electrode comprising a mantle enveloping the electrode mass and a casing outside said mantle and above the electrode holder, said casing being provided with a double wall and inlet and outlet for cooling fluid, the mantle with the electrode mass therein contained being movable longitudinally with reference to the casing.

5. The combination of an electrode, a casing spaced from and surrounding the electrode, and an electrode holder suspended from the casing and engaging the electrode below said casing.

6. A selfbaking electrode comprising a mantle enveloping the electrode mass and a casing outside said mantle said casing having suspension devices mounted on a frame displaceable in all directions transversely with respect to the axis of the electrode.

7. A selfbaking electrode comprising a mantle enveloping the electrode mass and a casing outside said mantle, said mantle having a stopping ring which stops the downward movement of the electrode when reaching the upper end of the said casing in which the electrode is suspended.

8. The combination of an electrode, a casing surrounding and spaced from the electrode, said electrode being movable longitudinally with respect to the casing, and means for introducing a cooling media between the electrode and casing.

9. The combination of an electrode baked while in use in the electric furnace, a casing surrounding the electrode and subject to the action of a cooling medium to thereby cool the electrode, means whereby the casing may be raised and lowered, and means carried by the casing for suspending the electrode therein, such electrode being movable longitudinally with respect to the casing.

10. The combination of an electrode, a fluid cooled casing surrounding the electrode, means for raising and lowering the casing, and a holder suspending the electrode within the casing, such holder being carried by the casing.

11. The combination of an electrode baked while in use in the electric furnace and having a mantle, a casing surrounding the mantle and forming therewith a space for cooling medium, and means for introducing cooling medium to the space for cooling the electrode.

12. The combination of an electrode baked while in use in the electric furnace, a casing surrounding the electrode, means for introducing cooling medium between the electrode and the casing, and means carried by the casing for suspending the electrode therein.

13. The combination of an electrode, a casing surrounding the electrode and subject to the action of a cooling medium to thereby cool the electrode, and a holder suspending the electrode within the casing, such holder being supported by the casing.

14. The combination of an electrode, a casing surrounding the electrode and with respect to which the electrode is longitudinally adjustable, means for raising and lowering the casing, and a holder carried by the casing for supporting the electrode.

MARTIN WALTHER.